United States Patent

[11] 3,626,299

[72] Inventor Leonard E. Hedlund
Omaha, Nebr.
[21] Appl. No. 861,125
[22] Filed Sept. 25, 1969
[45] Patented Dec. 7, 1971
[73] Assignee McMartin Industries, Inc.
Omaha, Nebr.
Continuation-in-part of application Ser. No. 702,424, Feb. 1, 1968, now abandoned, Continuation-in-part of application Ser. No. 408,216, Nov. 2, 1964, now abandoned. This application Sept. 25, 1969, Ser. No. 861,125

[54] FM RECEIVING NETWORK
17 Claims, 3 Drawing Figs.

[52] U.S. Cl. ........................................................ 325/349, 325/487, 329/140
[51] Int. Cl. ........................................................ H04b 1/16
[50] Field of Search ........................................... 325/315, 344, 349, 487; 329/140, 103, 110, 135

[56] References Cited

UNITED STATES PATENTS

| | | | |
|---|---|---|---|
| 2,207,691 | 7/1940 | Crosby ......................... | 329/140 |
| 2,390,209 | 12/1945 | D'Orio et al. ................. | 329/140 |
| 2,804,546 | 8/1957 | Wischmeyer ................. | 329/140 |

OTHER REFERENCES

TM 11- 668, Department of the Army Technical Manual–FM Transmitters and Receivers, Sept., 1952

Communications Systems & Techniques by Schwartz, Bennett & Stein, McGraw-Hill Book Co., pg. 155

K. S. Packard, Jr., Abstract, of Serial No. 611655, filed 8/20/1945, published in 626 OG285, on 9/6/1949, 250- 27.1

*Primary Examiner*—Robert L. Griffin
*Assistant Examiner*—Anthony H. Handal
*Attorney*—Hume, Clement, Hume & Lee

ABSTRACT: A receiving network for converting an FM radiofrequency input signal to a corresponding AM output signal including a selective radiofrequency input circuit coupled to a demodulator circuit having no inductive elements. The demodulator circuit comprises a diode rectifier and transistor coupled to a resistor-capacitor circuit.

Inventor.
Leonard Hedlund
By Hume, Clement, Hume & Lee
Attys.

FM RECEIVING NETWORK

CROSS REFERENCES TO RELATED APPLICATION

This application is a continuation in part of the copending application, Ser. No. 702,424, filed Feb. 1, 1968, now abandoned under the same title, which application is a continuation-in-part of a copending application, Ser. No. 408,216, filed Nov. 2, 1964, under the same title, now abandoned.

BACKGROUND OF THE INVENTION

The present invention relates to receiving networks and more particularly to an FM receiving network.

In the field of FM detector circuits, it has been the general practice to employ tuned circuits for operation. Heretofore it has also been the practice to utilize circuits similar to slope detectors in order to convert an FM signal into an AM signal as shown in FIG. 1. Although such devices have served the purpose, they have not proved entirely satisfactory under all conditions of service.

One such prior art circuit is shown in FIG. 1. The FM receiving network employs wholly passive components. This network approaches the circuit simplicity of the well-known AM "crystal set" and as such is very coarse in its tuning operation.

The prior art receiving network, which is generally designated by the numeral 10 in FIG. 1, includes an input circuit 11, a detector circuit 12, and an output circuit 13. The input circuit 11 is a conventional tuned circuit to which a suitable antenna 14 is connected so that optimum impedance matching may be realized. As a result of this circuit arrangement, the frequency modulated signal which is received by the tuned input circuit has sufficient power when fed to the detector circuit 12 to be converted to and produced as an audio output signal by the completely passive components forming the detector circuit 12.

The detector circuit 12 includes a semiconductor diode 18 that is connected between the conductor 17 and ground so that half-wave rectification of the signal supplied to the conductor 17 is effected thereby. The detector circuit 12 is completed by a series-parallel arrangement of a resistor 19 that is connected in series with a parallel RC-network 21 formed by a resistor 22 and a capacitor 23.

The output circuit 13 comprises a coupling capacitor 24 that is connected to the RC-network 21 so as to supply the audio signal developed across the network 21 to a suitable audio output transducer 25 (e.g., a high impedance conventional earphone or set of earphones).

The diode 18 rectifies the FM signal that is developed at the tap 15*a* and supplied to the conductor 17. That is, during each alternate half-cycle, the diode 18 either blocks or allows the FM signal to be shunted to ground. During those half-cycles when the diode 18 is in reverse biased (i.e., when the FM signal is not shunted to ground), the capacitor 23 is charged to a DC level through the resistor 19. During the immediately succeeding half-cycle, the capacitor 23 partially discharges to ground through two conductive paths defined (1) by the resistor 19 in series with the then conducting (and, therefore, low resistance). diode 18, and (2) by the resistor 22. This discharge is governed by the time constant of this circuit.

As the frequency of the FM input signal increases, the period between the rectified half-cycle pulses decreases. Therefore, the capacitor 23 has less time to discharge through the resistor 19 between pulses. As the slope of this discharge is governed by the fixed resistance-capacitance values, the instantaneous voltage will not reach as low a level before the next pulse is received. Therefore, the short term average DC level across the capacitor 23 will increase. This results in an output voltage which changes in level in accordance with a change in the input frequency, increasing as the input frequency increases, and vice-versa. Thus, demodulation is accomplished.

It will be recognized by one skilled in the art, however, that optimum demodulation cannot reliably be obtained with this circuit. Furthermore, the conventional tuned circuit commonly used in FM receivers suffers from drift due to the nonlinearity of the discriminator.

By utilizing the present invention, described below, complete linearity is obtained.

SUMMARY OF THE INVENTION

The general purpose of this invention is to provide an FM detector which embraces all of the advantages of similarly employed FM detectors and possesses one of the aforedescribed limitations. To attain this, the present invention contemplates a unique arrangement of a normally nonconducting transistor and diode in circuit with an RC network, whereby an FM input signal is supplied to this transistor which is converted to a DC signal that is proportional to the FM modulating frequency.

It is, therefore, an object of the present invention to provide a simple, reliable, and low cost FM receiving network.

Another object is to provide an FM receiving network which provides absolute linearity.

A further object is the provision of an FM receiving network which utilizes no tuned circuits.

Other objects and advantages of the present invention will become apparent from the following detailed description, particularly when considered in conjunction with the accompanying drawings.

DESCRIPTION OF THE PREFERRED EMBODIMENTS

Figure 1:
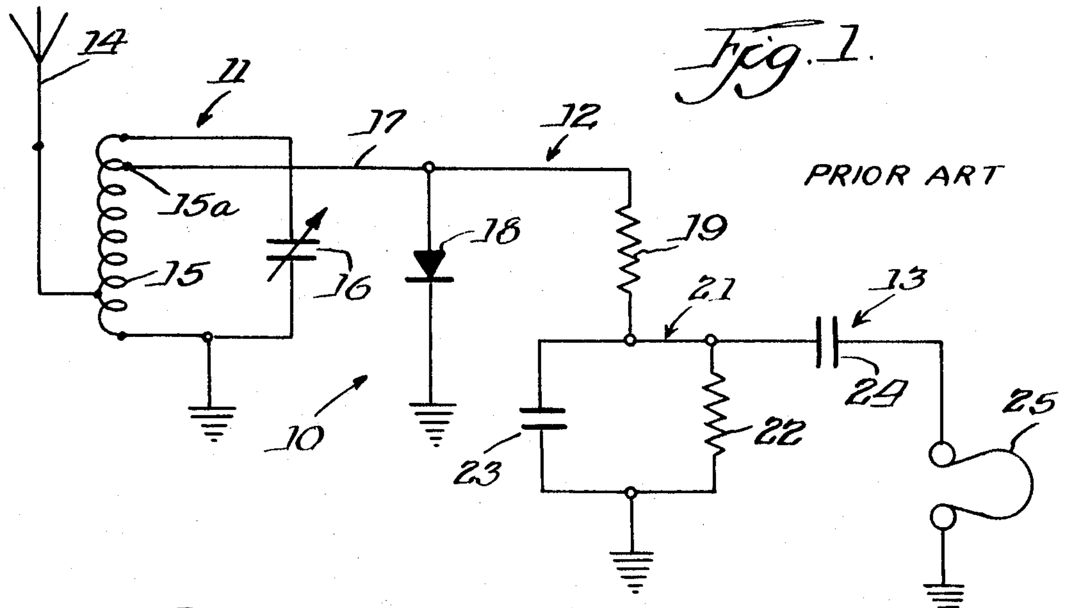
FIG. 1 is a schematic illustration of a prior art FM receiving network.
Figure 2:
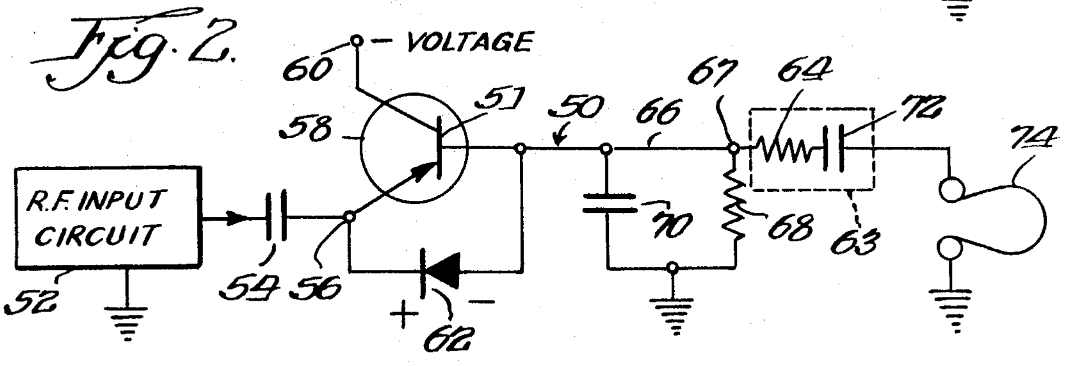
FIG. 2 is a schematic diagram of an FM receiving network in accordance with the invention.

Referring now to the drawings, wherein like reference characters designate like or corresponding parts throughout the several views, there is shown in FIG. 2, which illustrates a preferred embodiment, an FM demodulator circuit 50 which provides approximately twice the audio output for the same RF input as the prior art detector shown in FIG. 1 and has improved linearity.

The demodulator circuit 50 includes an RF input circuit 52, which is preferably selective. It may comprise a circuit like that of the input circuit 11 of FIG. 1 or any other suitable circuit. A hard limited or square wave input is desirable as more FM deviation energy is applied to the detector and this removes residual AM modulation and increases the audio output. However, any RF input circuit may be used. A capacitor 54 is connected in series with the output of the RF input circuit 52, as described above in connection with the conductor 17 of FIG. 1. The opposite side of the capacitor 54 is connected to a connecting point 56.

Also connected to the connecting point 56 is the emitter of a PNP-transistor 58. The collector of the transistor 58 is connected to a negative supply voltage source 60. The cathode of a diode 62 is the only other connection to the connecting point 56. The diode 62 corresponds in rectifying function to the diode 18 of FIG. 1, but is not connected to ground as in that circuit, it is connected to the base 51 of transistor 58.

An RC-circuit 66 is also connected to base 51 and constitutes part of demodulator circuit 50. The RC-network 66 comprises a resistor 68 and a capacitor 70.

Thus, for comprehending the operation of network 50 as described herein, the anode of the diode 62 may be considered as connected directly to the RC-circuit 66 between the capacitor 68 and the resistor 70, i.e., at the output point. The base of transistor 58 is connected to this same point and thus sees the voltage on capacitor 70 to ground.

The output circuit for the demodulator circuit 50 may be the same as that of the prior art network 10, comprising a capacitor 72 and transducer 74 corresponding to capacitor 24 and transducer 25 in FIG. 1. It will be appreciated that a suitable RF filter or deemphasis network 63 may be provided in the output circuit if desired. Deemphasis network 63 comprises a resistor 64 connected in series to a capacitor 72. Resistor 64 and capacitor 72 will act to remove the residual RF.

Considering the operation of the demodulator circuit 50, it will be appreciated that a frequency modulated RF full wave signal acts upon capacitor 54 at the output of the RF input circuit 52. The first half cycle charges capacitor 70 through diode 62 with a time constant equal to the product of the capacitance of capacitor 54 and capacitor 70 times the resistance of resistor 68. The time constant of RC circuit 66 is arranged such that capacitor 70 will charge to approximately 0.5 to 0.6 of its maximum voltage. This will give a voltage value across capacitor 70 at the end of the cycle of 0.6×Vin./(C54+C70).

Transistor 58 is normally nonconducting during the first-half cycle. On the next half cycle, transistor 58 conducts and discharges the voltage of capacitor 54 to the existing voltage output at the top end of capacitor 70. This means that transistor 58 forms a circuit such that each input cycle is added on top of the existing output voltage and the voltage steps will be equal. Thus, with a fixed frequency or carrier applied to the demodulator circuit 50, a DC voltage is developed across capacitor 70. When the carrier frequency is increased, the DC voltage across capacitor 70 is increased proportionally due to the products of the RC time constant of RC circuit 66. Likewise, when the carrier frequency is decreased the voltage across capacitor 70 is proportionally decreased due to the products of the RC time constant.

Thus, an FM frequency modulated signal produces a DC voltage across capacitor 70 which is directly proportional to the original modulating audio frequency and absolute linearity is achieved thereby preventing any distortion.

Capacitor 72 and resistor 64 which form deemphasis network 63 are used only for filtering purposes and are not required in the demodulation process.

It will be recognized by one skilled in the art that while transistor 58 is shown to be a PNP transistor, an NPN transistor of also be used.

In summation, demodulator circuit 50 provides a negligible distortion regardless of the frequency of the RF input. The area of the pulse width off the FM input and amplitude determines the amplitude of the recovered audio output. When the RF input and power supply voltage is held constant, the audio output becomes a function of width only and the DC voltage on capacitor 70 is proportional to the FM modulation deviation, or in other words, to the frequency modulation.

One specific embodiment of the FM demodulator circuit 50 that meets the aforedescribed requirements for the standard FM Broadcast Band employs the following exemplary components:

| | |
|---|---|
| Transistor 58 | SE 4002 |
| Capacitor 54 | 100 picofarads |
| Diode 62 | IN 51 silicon diode |
| Resistor 68 | 68 k. ohms |
| Capacitor 70 | 0.001 microfarads |
| Resistor 64 | 15 k. ohms |
| Capacitor 72 | 0.1 farad |

Figure 3:
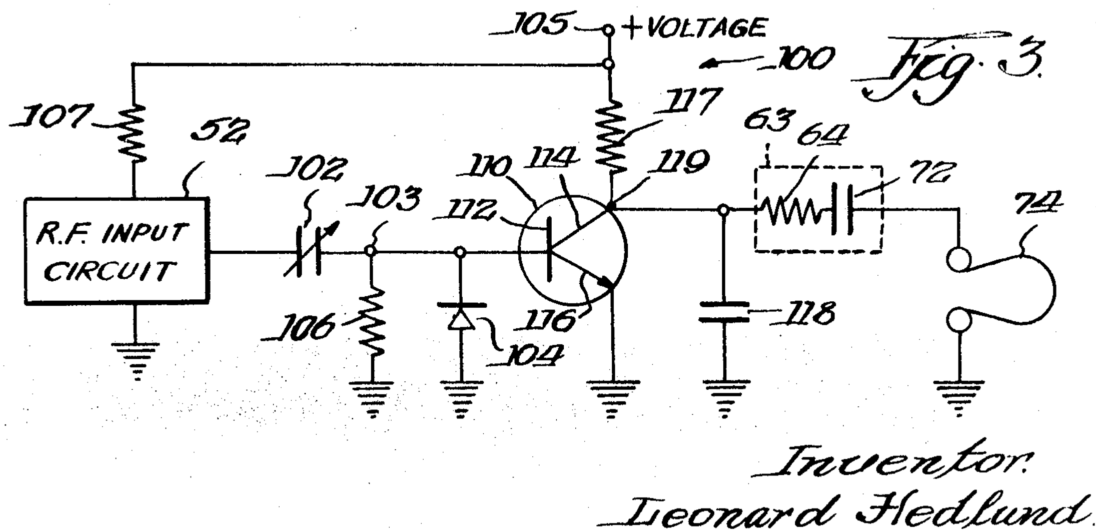
FIG. 3 is a schematic diagram of a further FM receiving network in accordance with the invention.

Referring now to FIG. 3, there is shown an FM demodulator circuit 100 which illustrates a second preferred embodiment. FM demodulator circuit 100 is similar to FM demodulator circuit 50 shown in FIG. 2 except that greater linearity and output is obtained. No tuned circuits are utilized in this demodulator circuit.

Referring more particularly to FIG. 3, there is shown an RF-input circuit 52 identical to the RF input circuit of FIG. 2. A variable capacitor 102 is connected in series with RF-circuit 52 as described above in connection with the capacitor 54 in FIG. 2. The opposite side of capacitor is connected to a connecting point 103.

Also connected to connecting point 103 is the base 112 of an NPN-transistor 110, a resistor 106, and a detector diode 104. Both the resistor 106 and the diode 104 are connected to ground. The collector 114 of transistor 110 is connected to a resistor 117 which in turn is connected to a positive bias voltage supply source 105. The emitter 116 of transistor 110 is connected to ground. Also connected to collector 114 is a capacitor 118. A resistor 107 is connected between the RF input circuit 52 and voltage supply source 105, and functions as a load resistor. The other side of capacitor 118 is connected to ground. A deemphasis network 63 comprising a resistor 64 and a capacitor 72 connected in series, may be connected to the junction of collector 114 and resistor 117. Deemphasis network 63 is provided as RF filter to remove the residual RF. transducer 74 is connected to the output circuit of demodulation network 100 and receives the audio signal developed across capacitor 118. Transducer 74 may be a conventional high impedance earphone or earphone set as utilized in FIGS. 1 and 2.

Demodulation circuit 100 basically differs from demodulation circuit 50 in that in the former circuit, transistor 110 is utilized as an amplifier while in the latter control transistor 58, it is not used an an amplifier. Moreover, a variable input capacitor 102 is used in demodulation circuit 100. It will be recognized by one skilled in the art that capacitor 102 need not be a variable capacitor and that any conventional capacitor of proper value could be substituted in the circuit. A variable capacitor is utilized in order to more accurately adjust the RC time constant of resistor 106 and capacitors 102 and 118 such that capacitor 118 will charge to approximately 0.6 of its maximum voltage.

The operation of FM demodulator circuit 100 will now be explained. The FM RF signal present at the output of input circuit 52 is sent through an adjustable capacitor 102 to diode 104 and resistor 106. Capacitor 102 and resistor 106 establish an RC time constant. The adjustable capacitor makes it possible to adjust the precise time constant required. It will be recognized that resistor 106 may also be adjustable. As explained above, a proper time constant may be obtained by properly proportioning of values capacitor 102 and resistor 106.

The positive voltage peak produced across capacitor 102 by the FM input turns on the normally off transistor 110 which is connected as a current amplifier. The positive input voltage peak produces high current peaks through resistor 117, which produces large voltage excursions across resistor 117. These highly amplified voltage peaks charge capacitor 118 to a high DC voltage. Now the high DC voltage across capacitor 118 is proportional to the FM modulation deviation or, in other words, to the frequency modulation of the input.

To obtain the proper RC treatment constant, the value of capacitor 102 is adjusted so that the voltage at point 119 is approximately one-half of the voltage applied to resistor 117 from source 105. By adjusting the voltage at point 119, the voltage across capacitor 118 becomes a function of voltage and time only and is proportional to the modulation frequency of input 52.

The FM demodulator circuit 50 shown in FIG. 2 doubles the DC output voltage, while demodulator network 100 shown in FIG. 3 utilizes the current gain of transistor 110 in order to multiply the DC output voltage by at least a factor of ten. This gives a greatly increased output while still maintaining linearity. Very little audio amplification is, therefore, required to follow demodulation network 100. FM demodulator circuit 100 has one significant advantage over FM demodulator circuit 50 and prior art demodulator network 10 shown in FIG. 1. FM demodulator circuit 100 has high immunity to amplitude modulation due to the fact that transistor 110 is triggered or turned on only by FM pulses. By utilizing a hard limited or square wave input, any residual AM modulation in the source would be eliminated and the audio output would be increased further.

One specific embodiment of the FM demodulation network 100 that meets the aforedescribed requirements for the standard FM broadcast band employs the following exemplary components:

| | |
|---|---|
| Transistor 110 | SE 4010 |
| Capacitor 102 | 2–10 picofarads |
| Resistor 106 | 10 k. ohms |
| Diode 104 | 1N3606 silicon diode |
| Resistor 107 | 2.2 k. ohms |
| Capacitor 118 | 100 picofarads |
| Resistor 117 | 10 k. ohms |
| Resistor 64 | 10 k. ohms |
| Capacitor 72 | 5 mf. |

The foregoing description of the FM demodulator circuits 50 and 100 are merely illustrative of the invention. Various modifications in the circuit arrangement as described herein might be effected without departing from the invention, various features of which are set forth in the accompanying claims.

What is claimed is:

1. A receiving network for effecting the conversion of a frequency modulated radiofrequency signal to a corresponding amplitude modulated audio output signal, which network comprises a radiofrequency input circuit having an output whereat a radiofrequency signal is produced and a demodulator circuit connected to said output of said input circuit, said demodulator circuit including a diode connected for rectifying said radiofrequency signal produced at the output of said input circuit and further including an RC passive network connected in circuit with said diode, and first circuit means for maintaining the instantaneous voltage level of said RC network and providing a step voltage added to said voltage level of said RC network indicative of said frequency modulation.

2. The receiving network of claim 1 wherein said first circuit means comprises a transistor.

3. The receiving network of claim 1 wherein said RC network has a time constant less than approximately 0.75 of the period of said radiofrequency signal.

4. The receiving network of claim 1 wherein an input capacitor and said diode provide a serial connection between the output of said input circuit and said demodulation circuit wherein said first circuit means is connected so as to increase the forward voltage applied across said diode by said input circuit.

5. The receiving network of claim 2 wherein said first circuit means is connected so as to also amplify said input signal when said transistor is conducting.

6. The receiving network of claim 5 wherein the time constant of said RC network is variable.

7. A receiving network for effecting the conversion of a frequency modulated radiofrequency signal to a corresponding audio output signal, which network comprises a selective radiofrequency input circuit having an output whereat a radiofrequency signal is produced and a demodulator circuit connected to said output of said input circuit, said demodulator circuit including a diode connected for rectifying said radiofrequency signal produced at the output of said input circuit and further including an RC network connected in circuit with said diode having a time constant proportional to the period of said radiofrequency signal, said proportional relationship being selected so that an amplitude modulated audio output signal of optimum linearity and amplitude is produced, and first circuit means for maintaining the instantaneous output voltage of said input circuit at not substantially less than the instantaneous voltage level at said point connecting said diode to said RC network and providing a step voltage added to said voltage on said capacitor in said RC network indicative of said frequency modulation.

8. The receiving network of claim 7 wherein an input capacitor and said diode provide a serial connection between the output of said input circuit and said RC network wherein said first circuit means is connected so as to increase the forward voltage applied across said diode by said input circuit.

9. The receiving network of claim 7 wherein said first circuit means comprises a transistor.

10. A receiving network for effecting the conversion of a frequency modulated radiofrequency signal to a corresponding amplitude modulated signal, which network comprises a selective radiofrequency input circuit having an output whereat a radiofrequency signal is produced and a demodulator circuit including a diode connected for rectifying said radiofrequency signal produced at the output of said input circuit and further including a passive circuit connected in circuit with said diode, said passive circuit being substantially formed by a resistive element and a capacitive element in series and having a time constant approximately one-half the period of said radiofrequency signal, having an output point intermediate said resistive and capacitive elements and first circuit means for maintaining the instantaneous output voltage of said input circuit at not substantially less than the instantaneous voltage level of said passive circuit at said output point and providing a step voltage added to said voltage level of said passive circuit indicative of said frequency modulation.

11. The receiving network of claim 10 wherein an input capacitor and said diode provide a serial connection between the output of said input circuit and said demodulation circuit wherein said first circuit means is connected so as to increase the forward voltage applied across said diode by said input circuit.

12. The receiving network of claim 10 wherein said first circuit means comprises a transistor.

13. A receiving network for effecting the conversion of a frequency modulated radiofrequency signal to a corresponding amplitude modulated signal comprising:

a radiofrequency input circuit comprising a first capacitor and having an output whereat a radiofrequency signal is produced; and a demodulator circuit connected to said output of said input circuit, said demodulator circuit comprising:

a diode connected for rectifying said radiofrequency signal produced at the output of said input circuit;

an RC network connected to said diode, said RC network being substantially formed by a resistive element and a second capacitive element; and a first circuit means connected to said diode and to said RC network for maintaining the instantaneous voltage level of said second capacitive element and for amplifying said input signal and providing a step voltage added to said voltage level of said second capacitive element indicative of said frequency modulation.

14. The receiving network of claim 13 wherein said first circuit comprises a transistor wherein said instantaneous voltage level is maintained when said transistor is nonconductive and said step voltage and amplification is provided when said transistor is conductive.

15. The receiving network of claim 14 wherein said collector of said transistor is connected to a DC supply voltage.

16. The receiving network of claim 15 wherein the RC time constant of said resistive element and said first capacitor and said second capacitive element is variable.

17. The receiving network of claim 16 wherein said RC time constant is adjusted wherein the voltage on said second capacitive element is approximately one-half of said voltage on said collector of said transistor.

* * * * *

UNITED STATES PATENT OFFICE
CERTIFICATE OF CORRECTION

Patent No. 3,626,299 Dated December 7, 1971

Inventor(s) Leonard E. Hedlund

It is certified that error appears in the above-identified patent and that said Letters Patent are hereby corrected as shown below:

Column 4, line 15, " transducer" should be --Transducer--

Column 4, line 51, " treatment " should be --time--

Signed and sealed this 30th day of May 1972.

(SEAL)
Attest:

EDWARD M.FLETCHER,JR.
Attesting Officer

ROBERT GOTTSCHALK
Commissioner of Patents